UNITED STATES PATENT OFFICE.

FERDINAND EVERS, OF DUSSELDORF, GERMANY.

METHOD OF MAKING TOBACCO SUPPLE.

973,768.　　　　Specification of Letters Patent.　　Patented Oct. 25, 1910.

No Drawing.　　Application filed June 7, 1910.　Serial No. 565,566.

*To all whom it may concern:*

Be it known that I, FERDINAND EVERS, a citizen of the German Empire, and residing at Dusseldorf, in the Province of Rhineland, Prussia, Germany, have invented new and useful Improvements in Methods of Making Tobacco Supple, of which the following is a specification.

With the methods heretofore practiced for making tobacco supple, glycerin was generally employed as the hygroscopic medium. So also cane sugar, technical grape sugar and glucose were mixed with the tobacco sauce, the technical grape sugar and glucose being obtained from starch. But the above substances serve only as flavoring mediums, neither cane sugar nor glucose obtained from starch being hygroscopic, and consequently not capable of serving as supplying agents. Glycerin is not only very expensive, but being frequently made from waste fats, is not an inviting addition to tobacco.

By my novel method, the tobacco is rendered supple in a harmless and appetizing manner.

In carrying out the invention, there is added to the usual sauce in which the tobacco is treated, levulose also termed fruit sugar and usually obtained from inulin. In lieu of the pure levulose, inverted sugar may be used, as the latter contains about 50 per cent. of levulose. The inverted sugar contains in addition to the levulose, about 50 per cent. of dextrose, which, however owing to its being free from dextrin, is materially different from glucose from starch. Furthermore the hygroscopic action of the levulose exceeds the drying action of the dextrose. In practice to 90 to 80 liters of sauce, obtained from extract from tobacco waste, licorice and tamarinds, are added about 10 kgs. of levulose or 20 kgs. of inverted sugar containing levulose. Within this solution the tobacco is soaked, so that it becomes thoroughly enriched thereby, which soaking may take place under heat. The tobacco leaves are then rolled into chewing tobacco either in a dry or moist condition.

I claim:

Method of making tobacco supple which consists in adding to 90–80 kgs. of a sauce of tobacco, licorice and tamarinds, about 10 kgs. of levulose or 20 kgs. of inverted sugar containing levulose and soaking the tobacco in this mixture.

FERDINAND EVERS. [L. S.]

Witnesses:
　OTTO KÖNIG,
　CHAS. J. WRIGHT.